United States Patent
Liu et al.

(10) Patent No.: US 7,581,143 B2
(45) Date of Patent: Aug. 25, 2009

(54) PERIPHERAL COMPONENT INTERCONNECT BUS TEST SYSTEM AND METHOD THEREFOR

(75) Inventors: Tao Liu, Tainjin (CN); Qi Zhao, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 430 days.

(21) Appl. No.: 11/708,489

(22) Filed: Feb. 21, 2007

(65) Prior Publication Data

US 2008/0201614 A1 Aug. 21, 2008

(51) Int. Cl.
*G06F 11/00* (2006.01)
(52) U.S. Cl. .............................. 714/43; 702/70; 702/71; 702/190
(58) Field of Classification Search .................. 714/43, 714/45; 702/66, 67, 70, 71, 190
See application file for complete search history.

(56) References Cited

U.S. PATENT DOCUMENTS

| 4,034,340 | A | * | 7/1977 | Sant'Agostino | 714/705 |
| 7,275,004 | B2 | * | 9/2007 | Casper et al. | 702/66 |
| 2003/0051194 | A1 | * | 3/2003 | Cabezas et al. | 714/43 |
| 2006/0168483 | A1 | * | 7/2006 | Sherlock et al. | 714/43 |
| 2008/0005622 | A1 | * | 1/2008 | Takahashi et al. | 714/43 |
| 2009/0055111 | A1 | * | 2/2009 | Williams et al. | 702/66 |

* cited by examiner

*Primary Examiner*—Marc Duncan
(74) *Attorney, Agent, or Firm*—Rabin & Berdo, P.C.

(57) ABSTRACT

A peripheral component interconnect (PCI) bus test system and method therefor, that is applied in a PCI test card. The PCI test card includes a static random-access-memory (SRAM). In the method, the data transaction of the PCI bus signal is disintegrated into a separate data operation, while eliminating the waveform interfering transaction. Through comparing the waveform of the data operation as separated from a PCI bus signal with the standard PCI bus waveform, the quality of the PCI bus signals can be precisely analyzed, thus realizing the hardware test of PCI bus.

4 Claims, 3 Drawing Sheets

PERIPHERAL COMPONENT INTERCONNECT BUS TEST SYSTEM AND METHOD THEREFOR

BACKGROUND

1. Field of Invention

The invention relates to a peripheral component interconnect (PCI) bus test system and method therefor, and in particular to a PCI bus test system and method of implementing the same by making use of signal waveforms.

2. Related Art

Presently, the conventional method of testing a PCI bus is realized through testing hardware by its software. For example, in such a test, a PCI test card is used, such that the operation of the test card is controlled through the execution of an upper-level software, hereby achieving the detection of PCI bus through the feedback of the test results. In this situation, the test is achieved essentially through testing the hardware aspects by its software aspects. As such, the test conducted in this manner is insufficient. Since the data transmission of computer system is realized through the digital signals, thus, in this way, as long as data can be transmitted accurately and correctly, then it is determined that the hardware is exist without any problem.

In practice, some defects may actually exist in the hardware. The reason that they have not been detected is only because the severity of these defects has not yet reached the critical threshold level. However, in some severe environment, such as high temperature, strong electric-magnetic interference (EMI) etc, these defects may surface and turn into real hardware problems. Therefore, in the prior art, a kind of test scheme is proposed, and that is realized through measuring and analyzing the signal waveforms generated by the hardware device, thus detecting the potential problems exist in the hardware. In the case of testing PCI bus, usually, the signal waveforms on the pins of PCI bus are measured and observed by means of an oscilloscope, and the waveforms are analyzed through the output of the oscilloscope to determine the signal quality of the PCU bus. However, due to the complexity of the PCI bus protocol, the data transfer of PCI bus will undergo a series of operations such as: initialization, hand-shake, and data transmission. Therefore, in general, on the screen of an oscilloscope, only large number of rapidly varying waveforms can be observed, and that are utilized to interpret the quality and the performance of PCI bus. Thus, in this condition, the determination of the quality and performance of PCI bus operation is rather difficult.

SUMMARY OF THE INVENTION

In view of the above-mentioned problems and drawbacks of the prior art, the object of the invention is to provide a peripheral component interconnect (PCI) bus test system and method, that is used to achieve accurate and effective testing of the PCI bus operation quality and performance.

To achieve the above-mentioned object, the invention provides a PCI bus test system that is applied in a PCI test card. In the invention, the PCI test card includes a static random-access-memory (SRAM), wherein, the test system comprises: a separator module, an oscilloscope, and a comparator. Herein, the separator module is used to separate the waveform interfering transaction from the data transaction of PCI bus signal, thus obtaining a data operation of the signal. The oscilloscope is utilized to display a specific waveform by making use of this data operation. Moreover, a comparator is used to compare the specific waveform output by the oscilloscope with a standard waveform of the PCI bus, hereby analyzing the quality of the signals transmitted on PCI bus.

Furthermore, the PCI test system of the invention may further includes a mapping module and an operation module. Wherein, the mapping module is used to map the static RAM into be a physical memory, thus performing data communication of the PCI bus; while the operation module is used to execute the various operations on the SRAM compatible with the specification of PCI protocol.

In addition, the invention provides a PCI bus test method applied in a PCI test card, including the following steps: mapping the SRAM of PCI test card into be a physical memory, thus being able to perform data communication on PCI bus; performing various operations on SRAM compatible with the specification of PCI bus protocol; separating the waveform interfering transaction from the data transaction of PCI bus signal, thus obtaining a data operation and displaying a specific waveform by making use of the data operation; and comparing the specific waveform output by the oscilloscope with a standard waveform of the PCI bus, hereby realizing the analyses of the signals transmitted on PCI bus.

Through the application of the PCI bus test system and method of the invention, the waveform interfering transaction is separated from the data transaction of PCI bus signal, thus obtaining a more authentic waveform of data operation. In addition, through the comparison of the authentic waveform correctly representing PCI bus signal with the standard waveform, the quality of the hardware of PCI bus can be determined more accurately.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow for illustration only, and thus is not limitative of the invention, and wherein.

DETAILED DESCRIPTION OF THE INVENTION

The purpose, construction, features, and functions of the invention can be appreciated and understood more thoroughly through the following detailed description with reference to the attached drawings.

In the following, the preferred embodiments of the invention will be described in detail together with the attached drawings.

Figure 1:
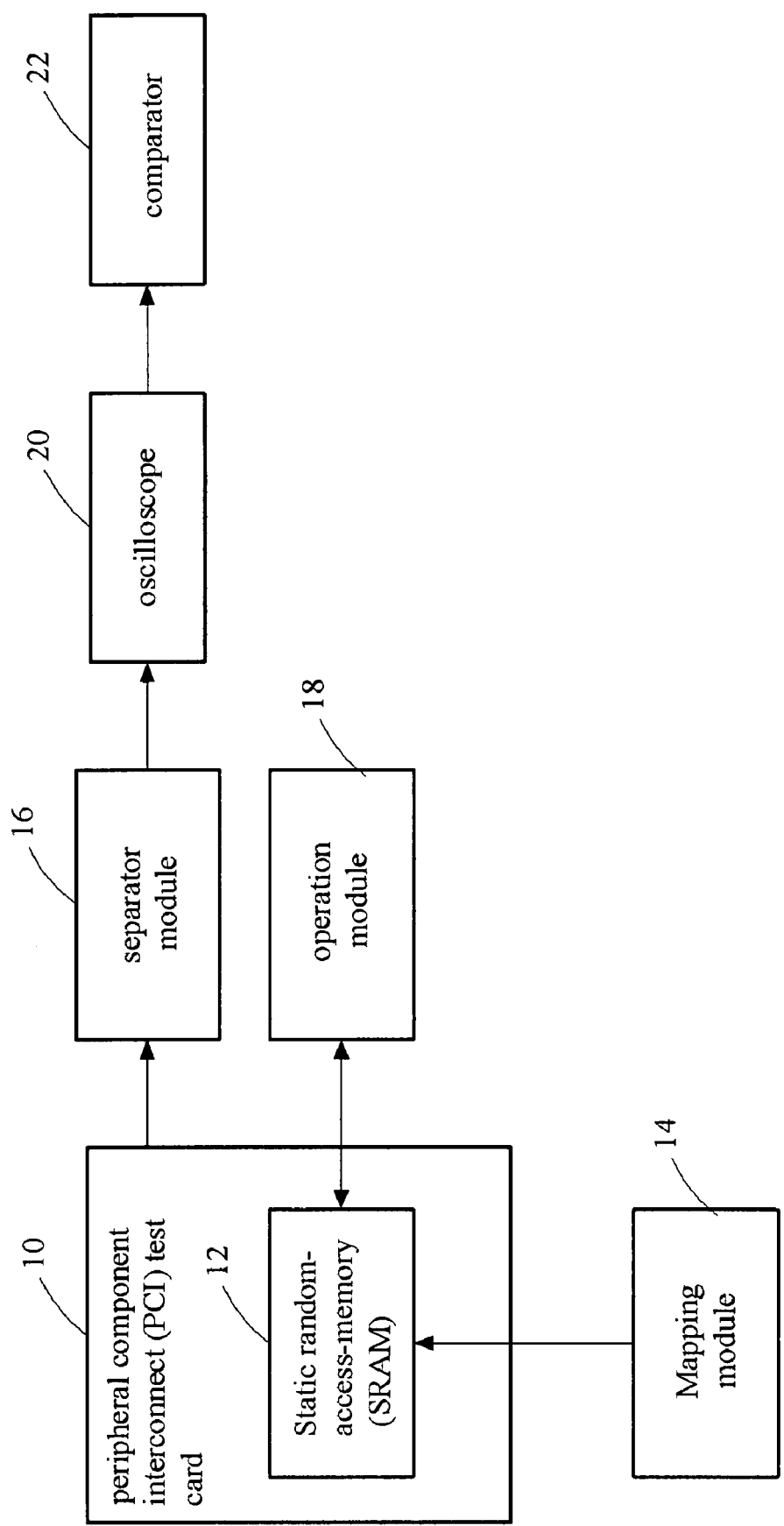
FIG. 1 is a system block diagram of a PCI bus test system according to an embodiment of the invention.

Refer to FIG. 1 for a system block diagram of a PCI bus test system according to an embodiment of the invention. As shown in FIG. 1, the PCI bus test system is applied in a PCI test card 10. In this configuration, the test card 10 with a static random access memory (SRAM) 12 is provided. Herein, a mapping module 14 is used to map SRAM 12 into be a physical memory, to set the attribute of this section of memory to be writable, and to exercise a protection for the contents of SRAM 12. As such, this section of SRAM 12 may be used to perform data communication of the PCI bus.

Therefore, through the afore-mentioned operation, a hardware storage space as SRAM 12 can be obtained. Then, an operation module 18 is used to perform various operations on PCI test card 10 compatible with the specification of PCI bus protocol by making use of this hardware storage space. In order to obtain recognizable PCI data waveform, a separator module 16 is used to separate the data transaction in the PCI bus signal into a data operation, while eliminating the waveform interfering transaction, such as initialization, hand-shake, data transmission and turning off transaction, hereby obtaining more ideal and authentic data waveforms. Herein, the application of data component separation technology means that the operations of initialization, hand-shake, turning off transaction need only be performed once. Since the data transmission operation repeat in large numbers, thus the probability of the emergence of the above-mentioned signal actions is very slim, thus separating the signal into the data operation.

The output terminal of separation module 16 is connected to an oscilloscope 20, that is used to get the data operation separated by the separator module 16 for observation, thus obtaining conveniently the signal waveform of a specific action, hereby being able to interpret accurately the operation and performance of PCI bus. Moreover, a comparator 22 is utilized to compare a specific waveform of PCI bus with a standard waveform of PCI bus, hereby determining if the specific waveform is stable and complete, thus being able to determine further as to the signal defects and potential hardware problems of PCI bus.

Figure 2:
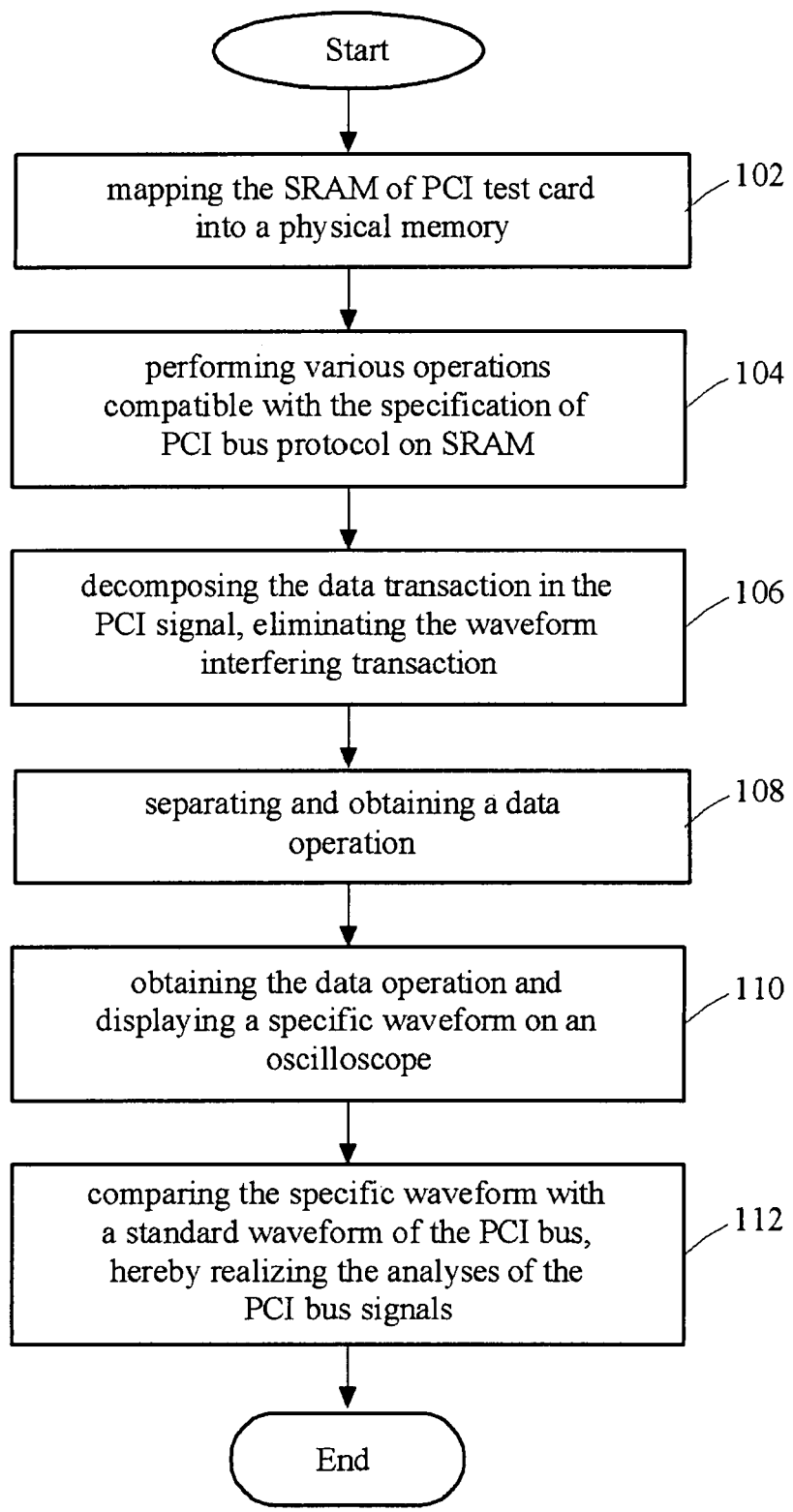
FIG. 2 is a system flowchart of the steps of a PCI bus test method according to an embodiment of the invention.

Now, refer to FIG. 2 for a system flowchart of the steps of a PCI bus test method according to an embodiment of the invention. As shown in FIG. 2, the PCI bus test method of the invention includes the following steps: Firstly, mapping the SRAM of PCI test card into a physical memory (step 102), wherein, this section of physical memory is set to be rewritable, and measures are taken to protect the data contained therein. As such, the SRAM may be used to perform data communication with PCI bus. Next, performing various operations compatible with the specification of PCI bus protocol on SRAM (step 104). In this process, searching and finding the PCI test card through the PCI bus by means of Pciscan function. Then, obtaining the physical memory mapping address of the PCI test card through a base address register of PCI configuration space, hereby operating the SRAM in the PCI test card based on the address.

While performing data communication of PCI bus through the SRAM, decomposing the data transaction in the PCI signal, eliminating the waveform interfering transaction (step 106), such as the actions related to initialization, hand-shake, and data transmission, thus separating and obtaining a data operation (step 108). While performing the test, operating the PCI test card register and its internal SRAM by signal, and obtaining the data operation of the PCI bus signal thus separated by means of an oscilloscope and displaying it on the oscilloscope (step 110). Subsequently, comparing the specific waveform output by the oscilloscope with a standard waveform of the PCI bus, hereby realizing the analyzing of the quality of the signals of the PCI bus (step 112).

Figure 3:
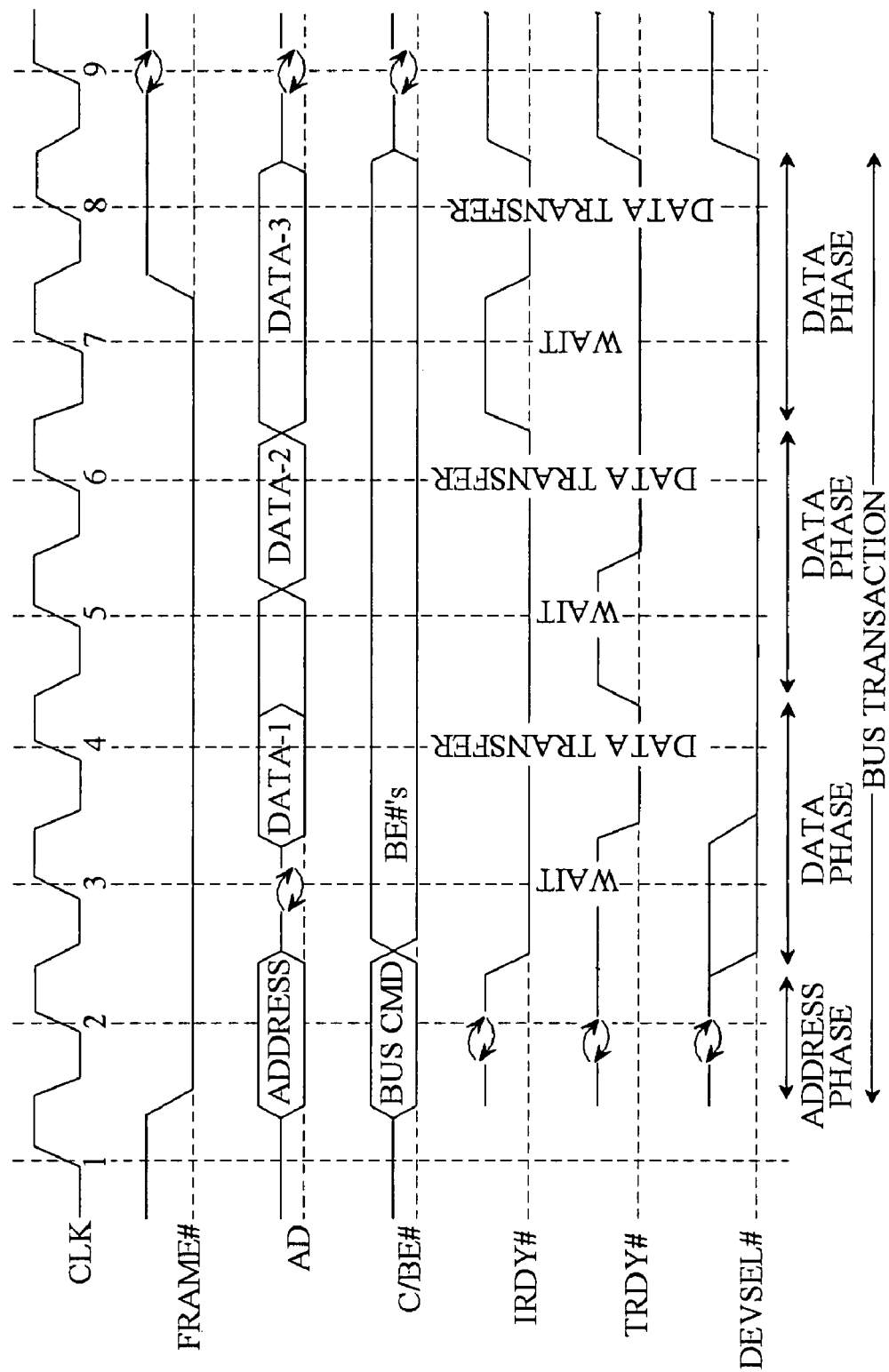
FIG. 3 is a waveform-timing chart of a data read cycle of a PCI bus of the invention.

In the following, the embodiment of the data read cycle operation of PCI bus will be described in conjunction with FIG. 3. When testing the read cycle waveform of PCI bus, it is required to perform the read cycle operation on SRAM. As shown in the timing chart of PCI bus read cycle, in general, the data read cycle of PCI bus is related to PCI pin signals of FRAME/IRDY/TRDY/DEVSEL, the detail of the relations between these pins and PCI read cycle will not be described in detail herein for brevity. Nevertheless, the data communication of PCI bus is enabled by the function and trigger of these pins. The address (AD) pin is a pin for the PCI data and address reuse, and the "address/data" information is transmitted according to the timing sequence of bus as shown in the drawing.

When the pin of FRAME is pulled down, the data read cycle of peripheral component interconnect begins. When the pin of DEVSEL/IRDY is pulled down, it can be observed that the AD pin starts transmitting the "address" information, and then if the response of DEVSEL is normal, then it begins transmitting the "data" information. Thus, when measuring the PCI read cycle signal, IRDY is used as the trigger signal for the oscilloscope. Since at this time, the "data" signal transmitted is of a kind of dedicated data pattern, therefore, the signal measured on the oscilloscope is of a more regular shape. For example, when the software enters a data read cycle, it reads out a dedicated data pattern from a register, and IRDY is used as a trigger signal of the oscilloscope, that is used for observing the PCI bus signals. The signal at pin of AD [0:31] (the pin can be designated by software, thus different pins may utilize different data patterns) is used as an observation signal. At this time, on the oscilloscope, the square wave having its bandwidth close to that of PCI bus clock pulse (CLK) can be observed. As such, the quality of PCI bus signals can be determined based on the observed rises and falls of the square wave with reference to the FRAME/IRDY/TRDY/DEVSEL signals.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A peripheral component interconnect (PCI) bus test system, that is applied in a PCI test card, the PCI test card includes a static random-access-memory (SRAM), wherein, the test system comprises:
   a separator module, used to separate a waveform interfering transaction from a data transaction of a signal of PCI bus signal, thus obtaining a data operation of the signal;
   an oscilloscope, used to display a specific waveform by collecting the data operation; and
   a comparator, used to compare the specific waveform outputted by the oscilloscope with a standard waveform of PCI bus, hereby realizing an analyses of quality of the signals transmitted on the PCI bus.

2. The peripheral component interconnect bus test system as claimed in claim 1, further comprising:
   a mapping module, used to map the SRAM into a physical memory, thus performing a data communication of the PCI bus; and
   an operation module, used to execute various operations on the SRAM compatible with a specification of a PCI protocol.

3. A peripheral component interconnect (PCI) bus test method, that is applied in a PCI test card, including following steps:

mapping a static random-access-memory (SRAM) of the PCI test card into a physical memory, so as to perform a data communication of a PCI bus;

performing various operations on the SRAM compatible with a specification of a PCI bus protocol;

separating a waveform interfering transaction from a data transaction of a signal of the PCI bus, thus obtaining a data operation of the signal;

displaying a specific waveform by making use of the data operation of the signal; and comparing the specific waveform with a standard waveform of the PCI bus, thus realizing an analyses of the signals transmitted on the PCI bus.

4. The peripheral component interconnect bus test method as claimed in claim 3, further comprising a step of:

setting the SRAM as a rewritable memory, and protecting contents contained therein.

* * * * *